US011959395B2

(12) United States Patent
Ren et al.

(10) Patent No.: US 11,959,395 B2
(45) Date of Patent: Apr. 16, 2024

(54) ROTOR BLADE SYSTEM OF TURBINE ENGINES

(71) Applicant: General Electric Company, Schenectady, NY (US)

(72) Inventors: Wei-Min Ren, Schenectady, NY (US); Letian Wang, Atlanta, GA (US); Kevin E. Turner, Liberty Township, OH (US); Yoon Seok Choi, Evendale, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/661,796

(22) Filed: May 3, 2022

(65) Prior Publication Data

US 2023/0358140 A1 Nov. 9, 2023

(51) Int. Cl.
*F01D 5/16* (2006.01)

(52) U.S. Cl.
CPC ............ *F01D 5/16* (2013.01); *F05D 2220/30* (2013.01); *F05D 2240/30* (2013.01); *F05D 2260/961* (2013.01)

(58) Field of Classification Search
CPC .... F01D 5/16; F05D 2220/30; F05D 2240/30; F05D 2260/961
See application file for complete search history.

(56) References Cited

U.S. PATENT DOCUMENTS

| | | | | |
|---|---|---|---|---|
| 4,118,147 | A * | 10/1978 | Ellis | F01D 5/16 416/500 |
| 9,835,166 | B2 | 12/2017 | Schoenenborn | |
| 10,215,194 | B2 * | 2/2019 | Theratil | F01D 5/16 |
| 10,267,155 | B2 | 4/2019 | Montes Parra | |
| 10,508,661 | B2 | 12/2019 | Schoenenborn | |
| 10,584,591 | B2 * | 3/2020 | Opoka | F04D 29/327 |
| 10,641,281 | B2 | 5/2020 | Foster et al. | |
| 10,801,329 | B2 | 10/2020 | Garay et al. | |
| 10,865,807 | B2 * | 12/2020 | Theratil | F01D 5/16 |
| 11,041,388 | B2 * | 6/2021 | Li | F01D 5/141 |
| 2002/0064458 | A1 * | 5/2002 | Montgomery | F04D 29/666 415/208.3 |
| 2014/0050590 | A1 | 2/2014 | Ghorbani Zarimahalleh et al. | |
| 2014/0072432 | A1 | 3/2014 | Woehler et al. | |

(Continued)

FOREIGN PATENT DOCUMENTS

| | | | |
|---|---|---|---|
| EP | 2378079 | A2 | 10/2011 |
| EP | 3372813 | B1 | 12/2020 |

(Continued)

OTHER PUBLICATIONS

U.S. Appl. No. 17/550,791, filed Dec. 14, 2021. [Available in IFW].

(Continued)

*Primary Examiner* — Brian Christopher Delrue
(74) *Attorney, Agent, or Firm* — Venable LLP; Peter T. Hrubiec; Michele V. Frank

(57) ABSTRACT

A rotor blade system. The rotor blade system includes a rotor and a plurality of blades coupled to the rotor. The plurality of blades are arranged in an airfoil distribution pattern. The airfoil distribution pattern includes one or more baseline blades and one or more intentionally mistuned blades including an intentional mistuning feature.

20 Claims, 7 Drawing Sheets

(56) References Cited

U.S. PATENT DOCUMENTS

| | | | | |
|---|---|---|---|---|
| 2016/0053617 | A1* | 2/2016 | Grelotti | F02C 3/04 416/175 |
| 2017/0175776 | A1* | 6/2017 | Theratil | F04D 29/327 |
| 2018/0135635 | A1* | 5/2018 | Staroselsky | F02C 3/04 |
| 2018/0274557 | A1* | 9/2018 | Theratil | F01D 5/16 |
| 2018/0274559 | A1* | 9/2018 | Theratil | F04D 29/325 |
| 2019/0107123 | A1* | 4/2019 | Veitch | F04D 29/666 |
| 2020/0141242 | A1* | 5/2020 | Nolcheff | B23P 15/04 |

FOREIGN PATENT DOCUMENTS

| | | | |
|---|---|---|---|
| EP | 3596311 | B1 | 4/2021 |
| WO | 2019199320 | A1 | 10/2019 |
| WO | 2020131062 | A1 | 6/2020 |

OTHER PUBLICATIONS

U.S. Appl. No. 17/537,223, filed Nov. 29, 2021. [Available in IFW].

* cited by examiner

ROTOR BLADE SYSTEM OF TURBINE ENGINES

TECHNICAL FIELD

The present disclosure relates generally to rotor blades of turbine engines.

BACKGROUND

A turbine engine, such as a gas turbine engine, generally includes a fan and a core. The fan includes fan blades.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
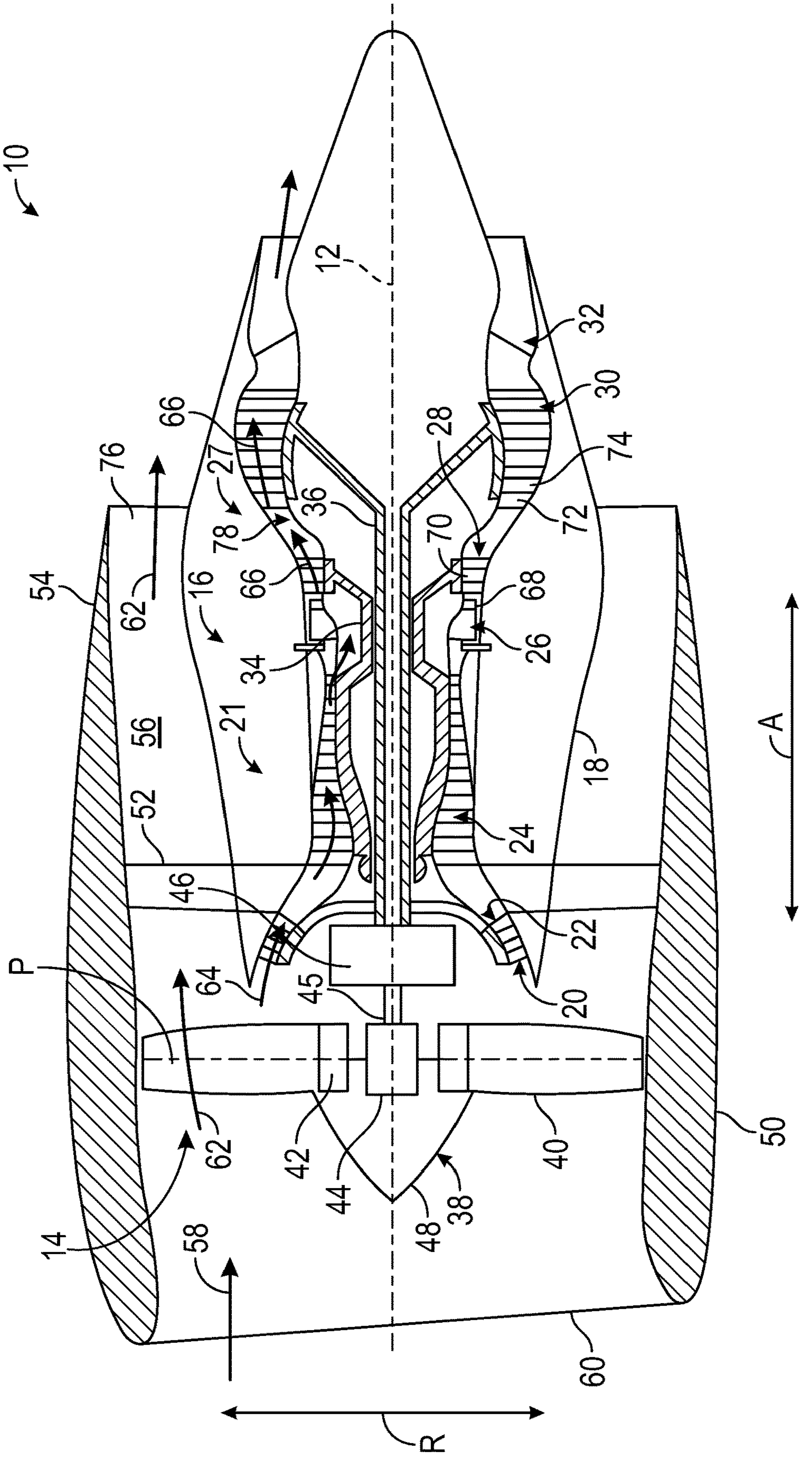
FIG. 1 is a schematic cross-sectional diagram of a turbine engine, according to an aspect of the present disclosure.

Additional features, advantages, and embodiments of the present disclosure are set forth or apparent from a consideration of the following detailed description, drawings, and claims. Moreover, it is to be understood that both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms “first,” “second,” and “third” may be used interchangeably to distinguish one component from another and are not intended to signify location or importance of the individual components.

The terms “upstream” and “downstream” refer to the relative direction with respect to fluid flow in a fluid pathway. For example, “upstream” refers to the direction from which the fluid flows, and “downstream” refers to the direction to which the fluid flows.

The terms “coupled,” “fixed,” “attached,” “connected,” and the like, refer to both direct coupling, fixing, attaching, or connecting, as well as indirect coupling, fixing, attaching, or connecting through one or more intermediate components or features, unless otherwise specified herein.

The singular forms “a,” “an,” and “the” include plural references unless the context clearly dictates otherwise.

As used herein, the terms “axial” and “axially” refer to directions and orientations that extend substantially parallel to a centerline of the turbine engine. Moreover, the terms “radial” and “radially” refer to directions and orientations that extend substantially perpendicular to the centerline of the turbine engine. In addition, as used herein, the terms “circumferential” and “circumferentially” refer to directions and orientations that extend arcuately about the centerline of the turbine engine.

As used herein, “flutter” is a self-excited vibration of a blade due to the interaction of structural-dynamic and aerodynamic forces.

As used herein, “flutter margin” is a measure, at a given flow rate, of a pressure ratio difference between an onset of flutter and an operating line of the blade.

As used herein, “loading shock” is a shockwave that is generated on the blade.

As used herein, the “natural frequency” of a blade is the frequency at which the blade vibrates or resonates.

As used herein, "mode shape" is a deformation that a blade would show when vibrating at a particular natural frequency of the blade.

As used herein, "mistune," "mistuning," and/or "mistuned" is a variation of a shape, of a size, and/or of a feature in a blade as compared to the shape, the size, and/or the features of another blade of a rotor. "Mistune," "mistuning," and/or "mistuned" includes altering or modifying the dynamic response to aerodynamic excitation relative to a baseline blade and/or to another intentionally mistuned blade present on the rotor with the intentionally mistuned blade. The altered or modified dynamic response includes one or more of shift(s) or change(s) in natural frequenc(ies) and/or changes in mode shape(s) relative to the baseline blade or the other intentionally mistuned blade As used herein, "baseline" blades are blades that include a baseline shape, a baseline size, and/or baseline features. Baseline blades include baseline natural frequencies and/or baseline mode shapes. In this way, baseline blades are not intentionally mistuned and do not include an intentional mistuning feature.

As used herein, an "intentionally mistuned blade" is a blade designed and formed to be mistuned relative to a baseline blade and/or to another intentionally mistuned blade. For example, an intentionally mistuned blade is designed and formed to have an altered or modified dynamic response to aerodynamic excitation relative to its baseline blade and/or another intentionally mistuned blade present on the rotor with the intentionally mistuned blade. The altered or modified dynamic response includes one or more of shift(s) or change(s) in natural frequenc(ies) and/or changes in mode shape(s) relative to the baseline natural frequencies and/or baseline mode shapes of the baseline blade or the natural frequencies and/or the mode shapes of the other intentionally mistuned blade.

As used herein, an "intentional mistuning feature" is the shape, the size, and/or the features of an intentionally mistuned blade that is different than the baseline shape, the baseline size, and/or the baseline features of a baseline blade and/or the shape, the size, and/or the features of another intentionally mistuned blade that is formed and designed to shift or change the natural frequencies and/or shift or change the mode shapes of the intentionally mistuned blade relative to the baseline natural frequencies and/or baseline mode shapes or the natural frequencies and/or mode shapes of the other intentionally mistuned blade.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A turbine engine, such as a gas turbine engine, generally includes a fan and a core arranged in flow communication with one another with the core disposed downstream of the fan in the direction of flow through the turbine engine. The core of the turbine engine generally includes, in serial flow order, a compressor section, a combustion section, a turbine section, and an exhaust section. With multi-shaft gas turbine engines, the compressor section can include a high-pressure compressor (HPC) disposed downstream of a low-pressure compressor (LPC), and the turbine section can similarly include a low-pressure turbine (LPT) disposed downstream of a high-pressure turbine (HPT). With such a configuration, the HPC is coupled with the HPT via a high-pressure shaft (HPS), and the LPC is coupled with the LPT via a low-pressure shaft (LPS). Various sections of the turbine engine including the fan, the HPC, the LPC, the HPT, and the LPT include rotors and a plurality of blades coupled to the rotors.

A turbine engine includes a parameter ("$AN^2$") that is equal to the product of the annulus mid-area along the rotor blade (A) and the blade rotational speed squared ($N^2$). Current engine designs strive for a greater $AN^2$. A greater $AN^2$ value indicates larger rotor blades and greater power output. A greater $AN^2$ coupled with a slim airfoil design can, however, introduce rotor instability including flutter. Flutter can occur in both stationary airfoils (e.g., vanes) or rotating airfoils (e.g., blades) of a fan, a booster, a compressor, or a turbine of the turbine engine. Flutter is the self-excited vibration of blades due to the interaction of structural-dynamic and aerodynamic forces. Flutter can lead to high-cycle fatigue (HCF) in the blade or even blade loss. Phase differences between the blades when the blades are vibrating can generate flutter. For example, if the blades are identical, the aeroelastic modes (coupled structural and aerodynamic system) are patterns of blade vibration with a constant phase angle between adjacent blades. Each aeroelastic mode has a different inter-blade phase angle. The inter-blade phase angle affects the phase between the local unsteady fluid flow through the blades and local blade motion, which, in turn, affects the unsteady aerodynamic work done on the blades. Adverse phase angles can lead to positive work being performed on the blades that results in flutter. Flutter normally is associated with one of the blade's mode shapes and normally occurs at a natural frequency of the blade and can produce sustained blade vibration.

Flutter can occur at subsonic speeds and at supersonic speeds based on flow conditions at the fan inlet. Subsonic flutter typically occurs at about fifty percent to about eighty percent of the operating corrected speed of the rotor. Supersonic flutter typically occurs at about one hundred percent to one hundred five percent (e.g., overspeed) of the operating corrected speed of the rotor. The corrected speed of the rotor is the altitude equivalent speed at sea level in ambient conditions. When the turbine engine operates in the subsonic flutter corrected speed range and/or in the supersonic flutter corrected speed range, a shock, also referred to as a loading shock, is generated on the suction side of the blades and relatively close to the leading edge (LE) of the blades. For example, the shock may be generated at about twenty percent to thirty percent from the LE of the blades. The shock may cause the blades to vibrate due to the random forces available in the system at harmless amplitudes. As the blades vibrate, the shock generates perturbed unsteady pressure and generates the aerodynamic work, as detailed above. Positive energy may be added to the blade and results in vibration of the blade with a larger amplitude, which may cause a self-excited vibration. The shock (e.g., the unsteady pressure) may propagate circumferentially around the rotor and may propagate upstream and/or downstream of the blades. The various embodiments described herein, and shown in the figures, are directed to mitigating flutter risks in engines.

Referring now to the drawings, FIG. 1 is a schematic cross-sectional diagram of a turbine engine 10, according to an embodiment of the present disclosure. As shown in FIG. 1, the turbine engine 10 defines an axial direction A (extending parallel to a longitudinal centerline 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft or spool 34 drivingly connects the HP turbine 28 to the HP compressor 24 to rotate the HP turbine 28 and the HP compressor in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline 12 via a fan shaft 45 that is powered by the LP shaft 36 across a power gearbox 46. The power gearbox 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of the air 62 is directed or routed into the bypass airflow passage 56, and a second portion of the air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or the spool 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate. This thereby supports operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it should be appreciated that, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Figure 2:
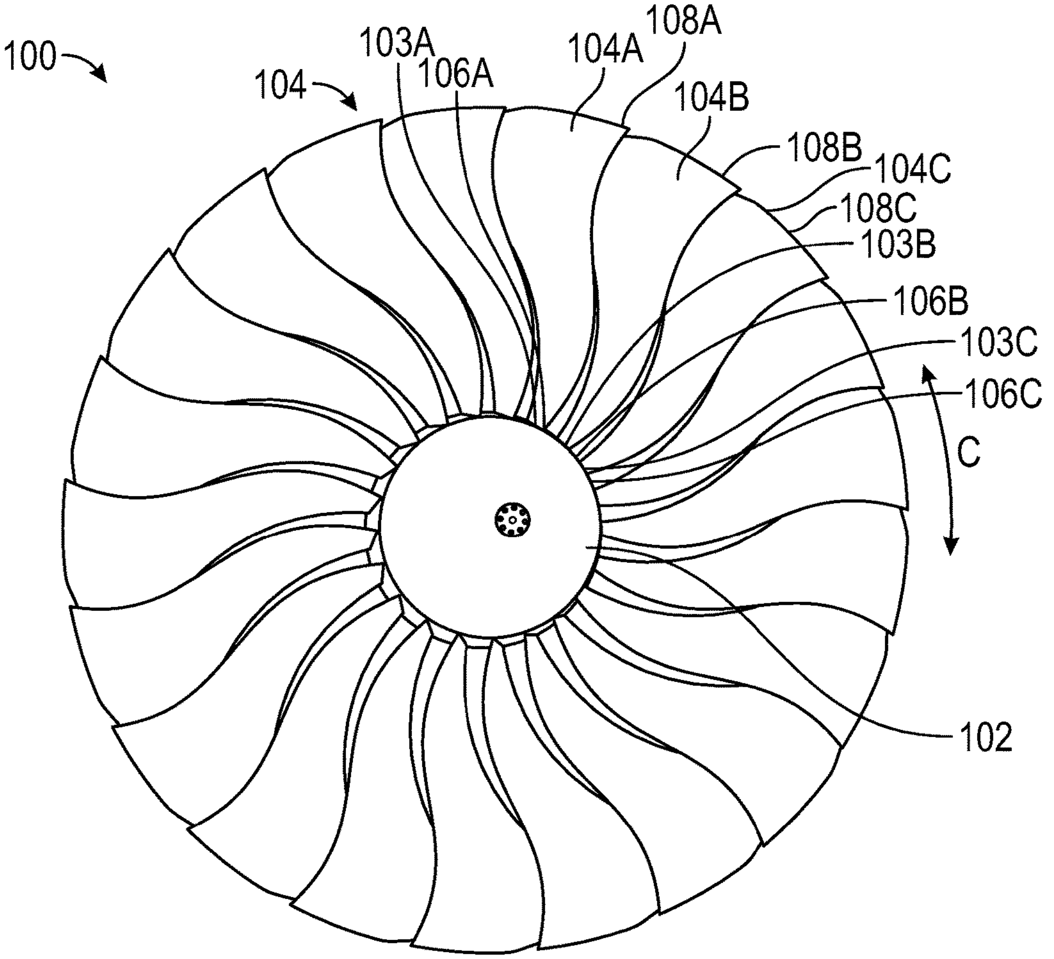
FIG. 2 is a schematic diagram of a front view of a rotor blade system having a rotor and a plurality of blades mounted thereon and positioned relative to a casing, according to an aspect of the present disclosure.

FIG. 2 is a schematic diagram of a front view of a rotor blade system 100 having a rotor 102 and a plurality of blades 104 mounted thereon, according to an embodiment of the present disclosure. The rotor blade system 100 depicted herein is the fan 38, the plurality of blades 104 are the fan blades 40, and the rotor 102 is the fan hub 48. In some examples, the rotor blade system 100 is used for the LP compressor 22 or the HP compressor 24. The rotor blade system 100 described herein, however, can be used in any system of the turbine engine 10. For example, the rotor blade system 100 described herein can be used in the LP turbine 30 and/or the HP turbine 28 of the turbine engine 10. The rotor blade system 100 is equally applicable to industrial gas turbines (IGTs) or power generation turbines. The present rotor blade system is not limited only to turbine engines, but can be used in any airfoil system where the goal is to reduce flutter.

The rotor blade system 100 has the plurality of blades 104 mounted to the rotor 102. In some examples, the rotor 102 and the plurality of blades 104 form an integrated component, also referred to as a blisk. In some examples, the plurality of blades 104 are inserted into the rotor 102 such that the plurality of blades 104 and the rotor are separate components. In an embodiment, as illustrated in FIG. 2, the blades 104 can be equally spaced circumferentially around the circumference C of rotor 102. In another embodiment, however, the blades 104 may be unequally spaced circumferentially around the circumference C of the rotor 102. The plurality of blades 104 rotate with the rotation of the rotor 102. The plurality of blades 104 include baseline blades 104A and first intentionally mistuned blades 104B. In some examples, the plurality of blades 104 also includes second intentionally mistuned blades 104C, as detailed below. The baseline blades 104A are blades 104 that include a baseline shape, a baseline size, and/or baseline features. Thus, baseline blades 104A are blades 104 without an intentional mistuning feature. The first intentionally mistuned blades 104B and the second intentionally mistuned blades 104C are blades 104 with an intentional mistuning feature 405 (FIG. 4), as detailed further below. For example, the intentional mistuning feature 405 changes the natural frequencies and/or the mode shapes of the intentionally mistuned blades with respect to the natural frequencies and/or the mode shapes of the baseline blades (e.g., the baseline natural frequencies and/or the baseline mode shapes) and/or of another intentionally mistuned blade. In this way, the first intentionally mistuned blades 104B and the second intentionally mistuned blades 104C provide for aerodynamic mistuning, natural frequency mistuning, and/or for mode shape mistuning relative to the baseline blades 104A, or relative to each other, to break self-excited fluid structure interactions, as detailed further below. This provides the ability to intentionally mistune the first intentionally mistuned blades 104B and the second intentionally mistuned blades 104C relative to the baseline blades 104A so as to control flutter. The intentional mistuning feature 405 (FIG. 4) and the location of the intentional mistuning feature 405 on a respective first intentionally mistuned blade 104B or a respective second intentionally mistuned blade 104C can be selected so that the natural frequency and/or the mode shape of the first intentionally mistuned blades 104B and the natural frequency and/or the mode shape of the second intentionally mistuned blades 104C can be mistuned relative to the baseline natural frequency and/or the baseline mode shape of the baseline blades 104A so as to control and to mitigate flutter. The intentional mistuning feature 405 can be selected from one or more intentional mistuning features, as detailed further below, to break self-excited fluid structure interaction.

The baseline blades 104A extend from a base 106A to a tip 108A of the baseline blades 104A. The base 106A is coupled to a platform 103A and the platform 103A is mounted to the rotor 102. Similarly, the first intentionally mistuned blades 104B extend from a base 106B to a tip 108B of the first intentionally mistuned blades 104B. The base 106B is coupled to a platform 103B and the platform 103B is mounted to the rotor 102. The second intentionally mistuned blades 104C extend from a base 106C to a tip 108C of the second intentionally mistuned blades 104C. The base 106C is coupled to a platform 103C and the platform 103C is mounted to the rotor 102.

FIGS. 3A through 3D show examples of patterns of blades 104, according to embodiments of the present disclosure. In an embodiment, a number and a pattern of baseline blades 104A and first intentionally mistuned blades 104B can be varied to allow for natural frequency and/or mode shape tuning flexibility. For example, the pattern includes an airfoil distribution pattern of first intentionally mistuned blades 104B for flutter mitigation. The airfoil distribution pattern includes a circumferential distribution of baseline blades 104A and first intentionally mistuned blades 104B on the rotor 102.

The embodiments of FIGS. 3A through 3D are directed to an alternating pattern of baseline blades and intentionally mistuned blades. In this way, the intentionally mistuned blades break the self-excited fluid structure interactions. Therefore, embodiments of the present disclosure are directed to mitigating flutter risks of turbofan engines. The present disclosure, however, may be directed to mitigating flutter risks for any type of turbine engine. Embodiments of the present disclosure seek to provide a way to intentionally mistune the blades so as to passively control flutter. For example, the embodiments described herein increase a flutter margin of the intentionally mistuned blades.

Figure 3A:
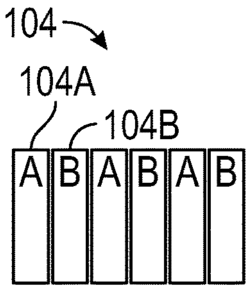
FIG. 3A shows an example of a pattern of the plurality of blades of FIG. 2, according to aspect of the present disclosure.

In the embodiment of FIG. 3A, the airfoil distribution pattern includes a first pattern P1. The first pattern P1 includes an "ABAB" pattern where "A" is a baseline blade 104A and "B" is a first intentionally mistuned blade 104B with an intentional mistuning feature. The embodiment of FIG. 3A includes an alternating arrangement of baseline blades 104A and first intentionally mistuned blades 104B. As detailed below, the first intentionally mistuned blades 104B are mistuned from the baseline blades 104A to break the self-excited fluid structure interactions. The first intentionally mistuned blades 104B may include a reduced aerodynamic performance as compared to the baseline blades 104A in order to achieve the intentionally mistuning. The "ABAB" pattern allows for a balance between separating the natural frequencies and/or the mode shapes between the baseline blades 104A and the first intentionally mistuned blades 104B, and aerodynamic performance of the rotor blade system 100.

Figure 3B:
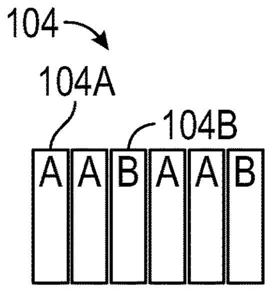
FIG. 3B shows an example of a pattern of the plurality of blades of FIG. 2, according to aspect of the present disclosure.

In the embodiment of FIG. 3B, the airfoil distribution pattern includes a second pattern P2. The second pattern P2 includes an "AABAAB" pattern in which one first intentionally mistuned blade 104B is disposed between two consecutive baseline blades 104A. The "AABAAB" pattern provides for increased aerodynamic performance, but reduced flutter mitigation, as compared to the "ABAB" pattern. For example, the more baseline blades 104A there are, the more aerodynamic performance of the rotor blade system 100. The fewer first intentionally mistuned blades 104B there are, however, the less mechanical damping is provided to mitigate the flutter.

Figure 3C:
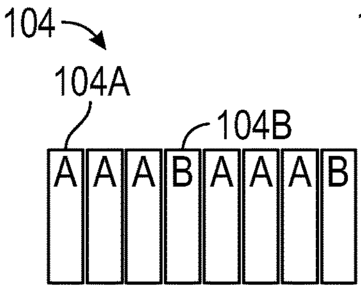
FIG. 3C shows an example of a pattern of the plurality of blades of FIG. 2, according to aspect of the present disclosure.

In the embodiment of FIG. 3C, the airfoil distribution pattern includes a third pattern P3. The third pattern P3 includes an "AAABAAAB" pattern in which one first intentionally mistuned blade 104B is disposed between three consecutive baseline blades 104A. The "AAABAAAB" pattern provides for increased aerodynamic performance, but reduced flutter mitigation, as compared to the "ABAB" pattern and to the "AABAAB" pattern.

Figure 3D:
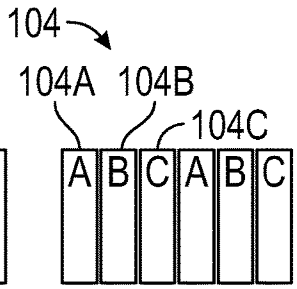
FIG. 3D shows an example of a pattern of the plurality of blades of FIG. 2, according to aspect of the present disclosure.

In the embodiment of FIG. 3D, the airfoil distribution pattern includes a fourth pattern P4. The fourth pattern P4 includes an "ABC" pattern where "B" is a first intentionally mistuned blade 104B having a first intentional mistuning feature, and "C" is a second intentionally mistuned blade 104C having a second intentional mistuning feature that is different than the first intentional mistuning feature (e.g., different intentional mistuning feature and/or different location of the intentional mistuning feature on the second intentionally mistuned blade 104C as compared to the first intentionally mistuned blade 104B). The "ABC" pattern provides for increased flutter mitigation as compared to the first airfoil distribution pattern P1, the second airfoil distribution pattern P2, and the third airfoil distribution pattern P3. Further, the second intentionally mistuned blade 104C provides for an additional degree of freedom to improve the tuning the pattern of blades to a specific flutter mode but increases manufacturing complexity due to having additional parts for the rotor blade system 100. In some examples, other patterns of the airfoil distribution pattern may include second intentionally mistuned blades 104C (e.g., in an "AABC" pattern, in an "AABBC" pattern, or the like). The airfoil distribution pattern is selected from the group consisting of P1, P2, P3, P4, or a combination thereof (examples of patterns P1, P2, P3, P4, or the combinations thereof are provided in FIGS. 4-10, respectively and the accompanying descriptions). For example, the airfoil distribution pattern is selected from the group consisting of repeating patterns of AB, AAB, AAB, AAAB, ABC, or combinations thereof.

When developing a gas turbine engine, the interplay among components can make it particularly difficult to select or to develop one component during engine design and prototype testing, especially, when some components are at different stages of completion. For example, one or more components may be nearly complete, yet one or more other components may be in an initial or a preliminary phase such that only one (or a few) design parameters are known. We desire to arrive at design possibilities at an early stage of design, so that the downstream selection of candidate improved designs, given the tradeoffs, become more predictable. Heretofore, the process has sometimes been more ad hoc, selecting one design or another without knowing the impact when a concept is first taken into consideration. For example, and referring to FIG. 1, various aspects of the fan section 14 design (e.g., fan 38 design, the fan blades 40 design, etc.), the combustion section 26 design, the compressor section 21 design, the turbine section 27 design, etc., may not be known, but such components impact the aerodynamic performance of the engine and, thus, may influence the design of the fan blades 40.

We desire to narrow the range of configurations or combination of features that can yield favorable results given the constraints of the design, feasibility, manufacturing, certification requirements to arrive at a more favorable balance between mitigating flutter and improved aerodynamic performance, i.e., improved efficiency in the conversion of kinetic energy in the fluid stream to mechanical energy in the turbine shaft. We also desire to make selections earlier in a design selection process to avoid wasted time and effort. During the course of the evaluation of different embodiments as set forth herein, we, the inventors, discovered, unexpectedly, that there exists a relationship between the pattern of mistuning and the intentional mistuning feature of the respective blades that uniquely identify a finite and readily ascertainable (in view of this disclosure) number of advantageous embodiments suitable for a particular architecture that addresses the flutter and the unsteady pressure experienced by the fan blades.

The airfoil distribution pattern (e.g., any of the patterns described in FIGS. 3A to 3D) is selected based on a balance of providing improved flutter mitigation without significant affects to aerodynamic performance of the rotor blade system 100. This balance is achieved by intentionally mistuning one or more blades in the airfoil distribution, as described in relation to FIG. 4. For example, the first intentionally mistuned blades 104B break up the self-excited fluid structure interactions, as detailed above, but may reduce aerodynamic performance. Thus, the more baseline blades 104A and the fewer first intentionally mistuned blades 104B in the airfoil distribution pattern, the higher the aerodynamic performance, but the lower the mechanical damping to break the self-excited fluid structure interactions. Likewise, the more first intentionally mistuned blades 104B and the fewer baseline blades 104A in the airfoil distribution pattern, the higher the mechanical damping to break the self-excited fluid structure interactions, but the lower the aerodynamic performance. The desired airfoil distribution pattern is selected based on a balance of the desired aerodynamic performance while mitigating flutter risk.

Figure 4:
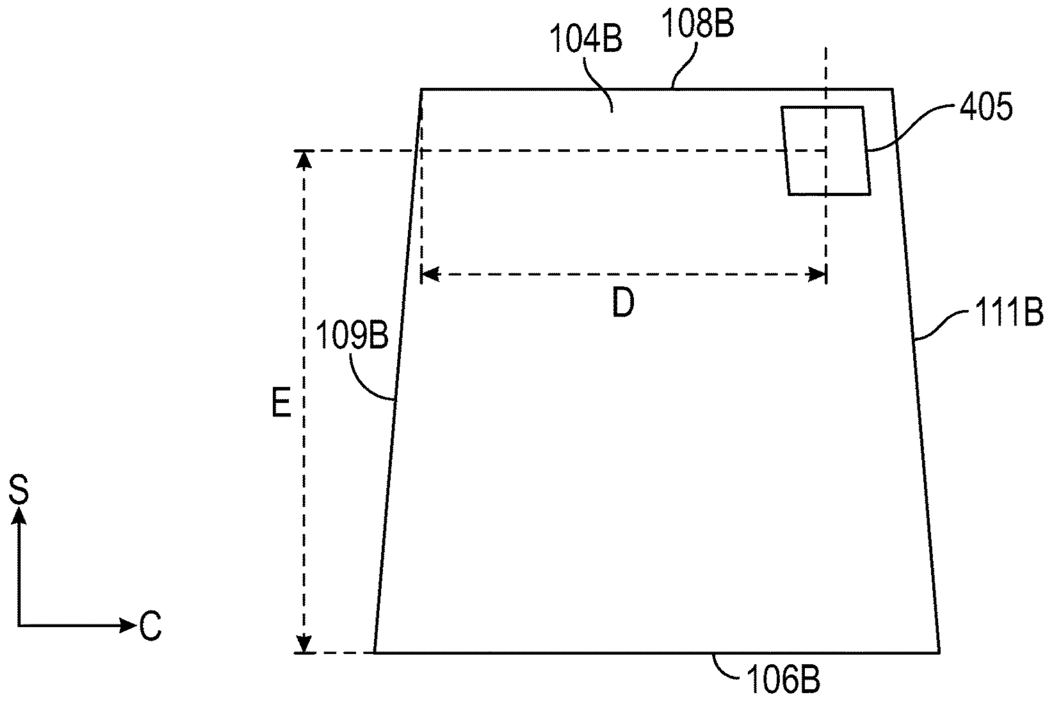
FIG. 4 is a schematic representation of an intentionally mistuned blade of the plurality of blades of FIG. 2, according to an aspect of the present disclosure.

FIG. 4 is a schematic representation of a first intentionally mistuned blade 104B, according to embodiments of the present disclosure. While reference is made to the first intentionally mistuned blades 104B, the embodiments described herein may be applicable to the second intentionally mistuned blades 104C. As shown in FIG. 4, the first intentionally mistuned blade 104B is defined by a span in a spanwise direction S and a chord in a chordwise direction C. The span of the first intentionally mistuned blade 104B is defined from the base 106B to the tip 108B. The chord of the first intentionally mistuned blade 104B is defined from a leading edge (LE) 109B of the first intentionally mistuned blade 104B to a trailing edge (TE) 111B of the first intentionally mistuned blade 104B. In some examples, the chord of the first intentionally mistuned blade 104B varies along the span of the first intentionally mistuned blade 104B.

In the embodiment of FIG. 4, the first intentionally mistuned blade 104B includes an intentional mistuning feature 405. Intentional mistuning is achieved by one or more intentional mistuning features, as detailed further below, for natural frequency mistuning and/or for mode shape mistuning of the first intentionally mistuned blade 104B relative to the baseline natural frequencies and/or the baseline mode shapes of the baseline blade 104A. For example, the intentional mistuning feature 405 may control the natural frequencies and/or the mode shapes of the first intentionally mistuned blade 104B relative to the baseline natural frequencies and/or the baseline mode shapes of the baseline blade 104A. The intentional mistuning feature 405 may be located on the first intentionally mistuned blade 104B at a spanwise location and at a chordwise location. The location of the intentional mistuning feature 405 on the first intentionally mistuned blade 104B is defined by a mistuning axial index D and a mistuning radial index E. The mistuning axial index D includes a percent of the chord of the first intentionally mistuned blade 104B. The mistuning radial index E includes a percent of the span of the first intentionally mistuned blade 104B.

The type of intentional mistuning feature 405 and the location of the intentional mistuning feature 405 on the first intentionally mistuned blade 104B is selected to change natural frequency or the natural frequencies and/or associated mode shape(s) of the first intentionally mistuned blade 104B relative to baseline natural frequencies and/or baseline mode shapes of the baseline blades 104A. For example, changing (e.g., adding or removing) mass of the first intentionally mistuned blade 104B changes the natural frequencies of the first intentionally mistuned blade 104B relative to the baseline natural frequencies of the baseline blade 104A. Changing a location (e.g., a spanwise location and/or a chordwise location) of the intentional mistuning feature 405 on the first intentionally mistuned blade 104B changes the natural frequencies and/or the mode shapes of the first intentionally mistuned blade 104B relative to the baseline natural frequencies and/or the baseline mode shapes of the baseline blade 104A. The location of the intentional mistuning feature 405 may include any axial location and any radial location on the first intentionally mistuned blade 104B, such that the mistuning axial index D is greater than zero percent and less than or equal to one hundred percent and the mistuning radial index E is greater than zero percent and less than or equal to one hundred percent. The embodiments detailed below include exemplary ranges of the mistuning axial index D and the mistuning radial index E. The embodiments may include any range of the mistuning axial index D and the mistuning radial index E.

Figure 5A:
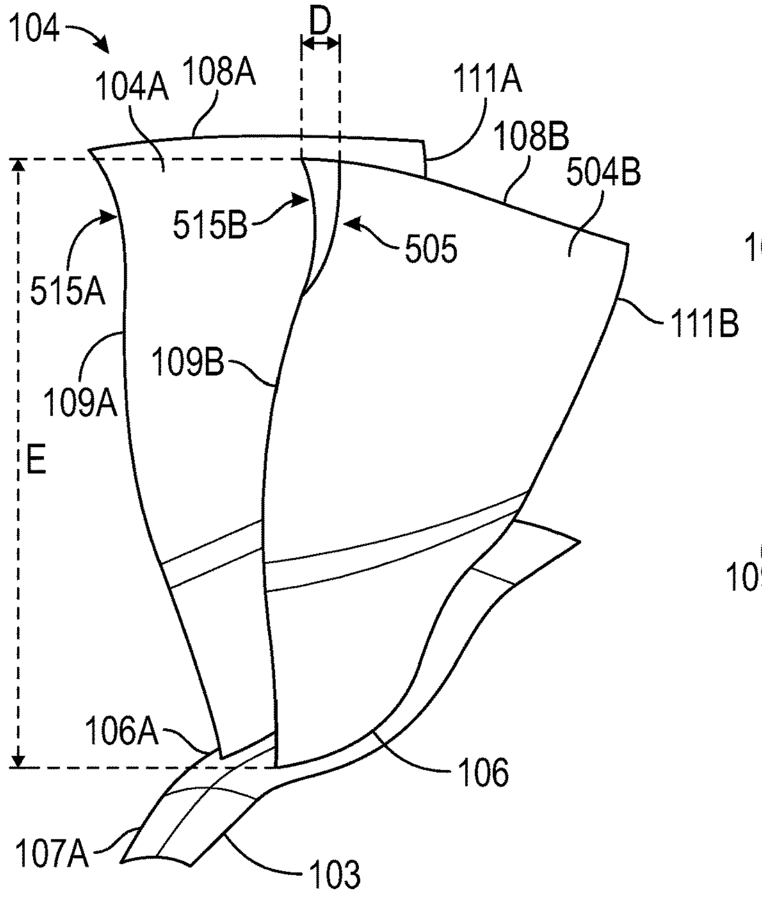
FIG. 5A is a schematic perspective view of a baseline blade and an intentionally mistuned blade, according to another embodiment of the present disclosure.
Figure 5B:
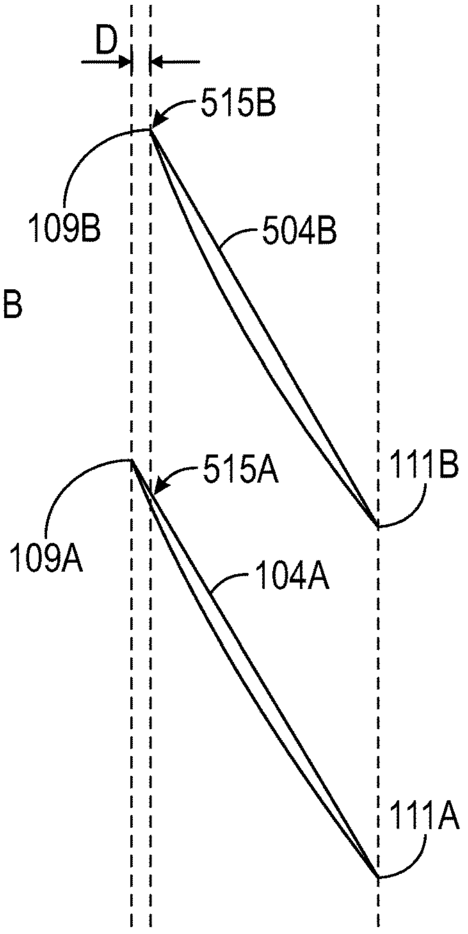
FIG. 5B is a schematic top view of the baseline blade and the intentionally mistuned blade of FIG. 5A, according to an aspect of the present disclosure.

FIG. 5A is a schematic perspective view of a baseline blade 104A and a first intentionally mistuned blade 504B having an intentional mistuning feature 505. FIG. 5B is a schematic top view of the baseline blade 104A and the first intentionally mistuned blade 504B. The baseline blade 104A includes a leading edge (LE) 109A and a trailing edge (TE) 111A. The baseline blade 104A and the first intentionally mistuned blade 504B each includes substantially the same airfoil profile shape. Further, the span of the first intentionally mistuned blade 504B is substantially the same as the span of the baseline blade 104A. As detailed above, shocks may propagate in a tip region of the plurality of blades 104 and may cause flutter due to the added work on the blades 104, as detailed above.

In the embodiment of FIGS. 5A and 5B, the intentional mistuning feature 505 includes a reduced chord length in a tip region 515B of the first intentionally mistuned blade 504B. In this way, a chord of the first intentionally mistuned blade 504B in the tip region 515B is different than the chord in a tip region 515A of the baseline blade 104A. In FIGS. 5A and 5B, the tip region 515B is defined from eighty five percent of the span to one hundred percent of the span of the first intentionally mistuned blade 504B, where one hundred percent of the span is at the tip 108B. The chord of the first intentionally mistuned blade 504B is the same as the chord of the baseline blade 104A from the base 106B to eighty five percent of the span. At eighty five percent of the span, the chord of the first intentionally mistuned blade 504B begins to reduce as compared to the chord of the baseline blade 104A at the same span location. The chord of the first intentionally mistuned blade 504B gradually reduces as a percentage of the chord of the baseline blade 104A along the span of the first intentionally mistuned blade 504B in the tip region 515B, per Table 1 below.

TABLE 1

| Mistuning Radial Index (E) | Mistuning Axial Index (D) |
|---|---|
| 100% | 9% to 18% |
| 97.5% | 9% to 18% |
| 95% | 8% to 16% |
| 90% | 4% to 8% |
| 85% | 0.00% |

As shown in Table 1, at a ninety percent span location, the chord of the first intentionally mistuned blade 504B is four to eight percent less than the chord of the baseline blade 104A. At a ninety five percent span location, the chord of the first intentionally mistuned blade 504B is eight to sixteen percent less than the chord of the baseline blade 104A. At a ninety-seven-point five percent span location, the chord of the first intentionally mistuned blade 504B is nine to eighteen percent less than the chord of the baseline blade 104A. At a one hundred percent span location (e.g., at the tip 108B), the chord of the first intentionally mistuned blade 504B is nine to eighteen percent less than the chord of the baseline blade 104A. Thus, the mistuning axial index D varies as a function of the mistuning radial index E in the tip region 515B. The mistuning axial index D is greater than zero percent and less than or equal to one hundred percent. The mistuning radial index E is greater than eighty five percent and less than or equal to one hundred percent. FIG. 5B shows the reduced chord in the tip region 515B of the first intentionally mistuned blade 504B as compared to the chord in the tip region 515A of the baseline blade 104A without a reduced chord. For example, the chord of the first intentionally mistuned blade 504B in the tip region 515B is greater than zero and less than or equal to eighteen percent of the chord of the baseline blade 104A in the tip region 515A, as shown by the mistuning axial index D in FIG. 5B.

Reducing the chord in the tip region 515B helps to move the shock location towards the LE 109B of the first intentionally mistuned blade 504B relative to the baseline blade 104A. In this way, the shock is reduced in the tip region 515B. When the chord of the first intentionally mistuned blade 504B is eighteen percent less than the chord of the baseline blade 104A, the shock in the tip region 515B is removed. Reducing the chord in the tip region 515B allows for mistuning the natural frequencies and/or the mode shapes of the first intentionally mistuned blade 504B relative to the baseline natural frequencies and/or the baseline mode shapes of the baseline blade 104A without a complete redesign of the airfoil of the first intentionally mistuned blade 504B. Thus, the first intentionally mistuned blades 504B disrupt the self-excited fluid structure interactions, as detailed above. The chord in the tip region 515B of the first intentionally mistuned blade 504B is varied, per the above, to mitigate the flutter risk with relatively minimal impact on the aerodynamic performance of the first intentionally mistuned blade 504B.

The embodiment of FIGS. 5A and 5B increases the flutter margin, as compared to a baseline blade 104A, by moving the shock location towards the LE 109B and/or upstream of the LE 109B of the first intentionally mistuned blade 504B. In this way, the mass of the first intentionally mistuned blade 504B is less than the mass of the baseline blade 104A. Thus, the embodiment of FIGS. 5A and 5B provides for mistuning natural frequencies and mistuning mode shapes of the first intentionally mistuned blades 504B relative to the baseline natural frequencies and/or the baseline mode shapes of the baseline blade 104A. While the embodiment of FIGS. 5A and 5B show a reduced chord from the LE 109B, the reduced chord may be from the TE 111B in some examples.

Figure 6A:
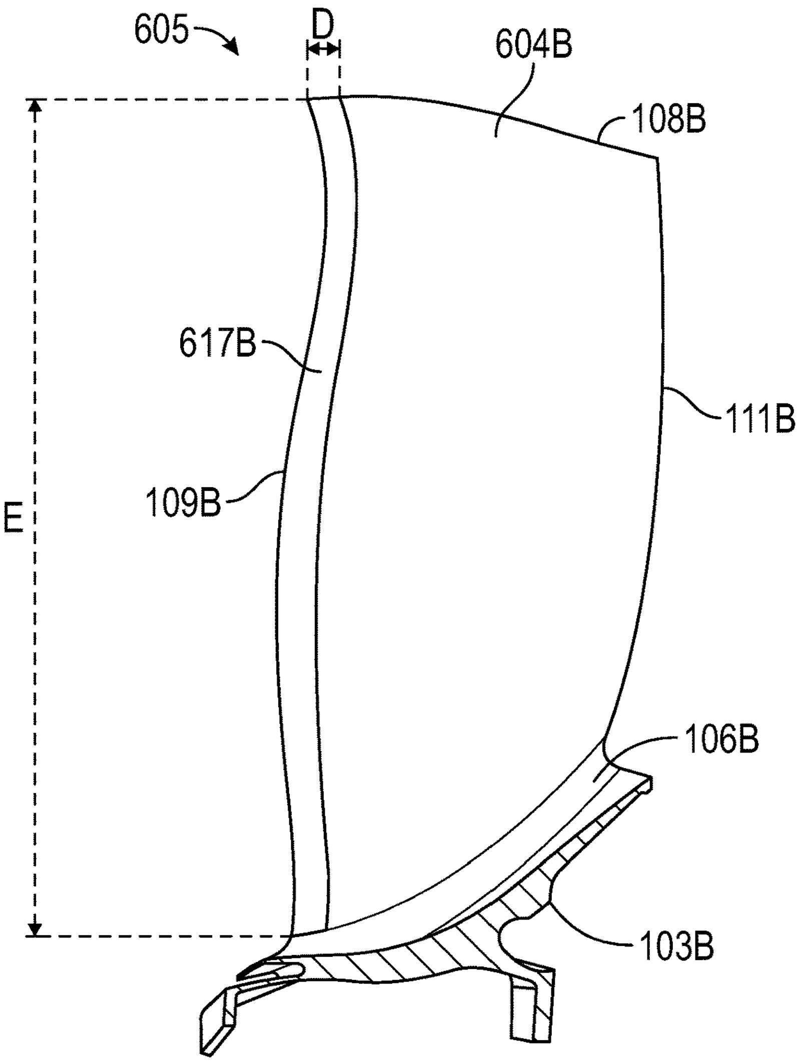
FIG. 6A is a schematic perspective view of an intentionally mistuned blade, according to another embodiment of the present disclosure.
Figure 6B:
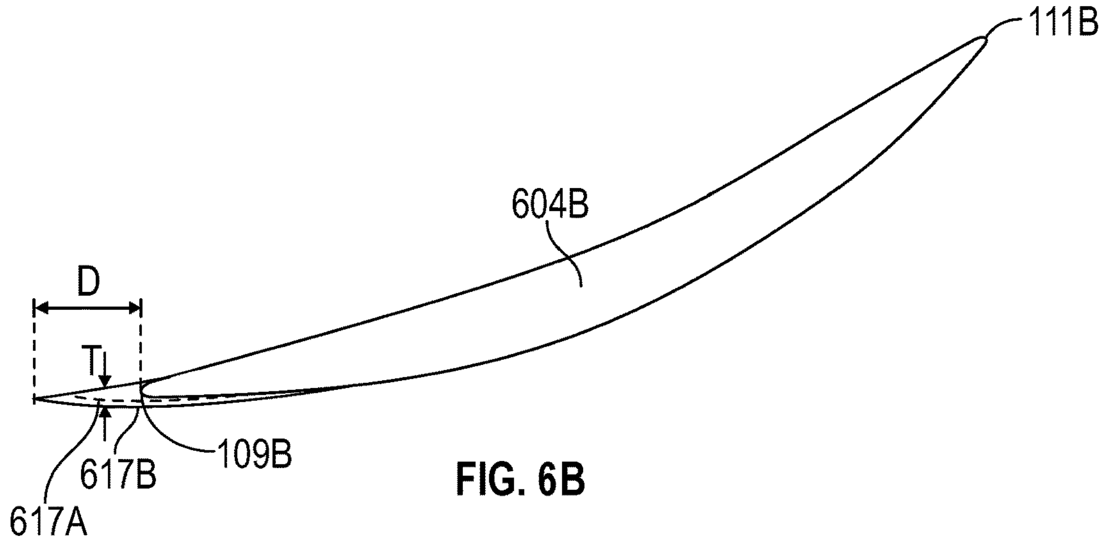
FIG. 6B is a schematic top view of the intentionally mistuned blade of FIG. 6A, according to an aspect of the present disclosure.

FIG. 6A is a schematic perspective view of a first intentionally mistuned blade 604B, according to an aspect of the present disclosure. FIG. 6B is a schematic top view of the first intentionally mistuned blade 604B. The baseline blade 104A (FIG. 2) and the first intentionally mistuned blade 604B each includes substantially the same airfoil profile shape. Further, the span and the chord of the first intentionally mistuned blade 604B is substantially the same as the span and the chord of the baseline blade 104A (FIG. 2), respectively.

In the embodiment of FIGS. 6A and 6B, the first intentionally mistuned blade 604B includes an LE sheath 617B and the baseline blade 104A includes an LE sheath 617A (shown by dashed lines in comparison to the LE sheath 617B in FIG. 6B). The LE sheath 617B and the LE sheath 617A each includes a metallic sheath (e.g., titanium) attached to the LE 109B of the first intentionally mistuned blade 604B and attached to the LE 109A (FIG. 5A) of the baseline blade 104A, respectively. The LE sheath 617B and the LE sheath 617A protect the first intentionally mistuned blade 604B and the baseline blade 104A, respectively, from impacts, such as, for example, impacts from foreign objects (e.g., bird strikes, debris, or the like). The LE sheath 617B and the LE sheath 617A extend substantially an entire spanwise length of the first intentionally mistuned blade 604B and the baseline blade 104A, respectively. In some examples, the LE sheath 617B and the LE sheath 617A may extend less than the entire spanwise length of the first intentionally mistuned blade 604B and the baseline blade 104A, respectively.

An intentional mistuning feature 605 includes a varied chord length and/or a varied thickness T of the LE sheath 617B of the first intentionally mistuned blade 604B relative to the LE sheath 617A of the baseline blade 104A. The mistuning axial index D includes a chord length of the LE sheath 617B relative to the LE sheath 617A of the baseline blade 104A. The mistuning radial index E includes a spanwise location of a change of the chord length of the LE sheath 617B relative to a chord length of the LE sheath 617A. The mistuning axial index D is greater than or equal to five percent and less than or equal to twenty five percent. In this way, the chord of the LE sheath 617B is larger than the chord of the LE sheath 617A of the baseline blade 104A by five percent to twenty five percent. The mistuning radial index E is greater than zero percent and less than or equal to one hundred percent of the span of the first intentionally mistuned blade 604B. In this way, the chord length of the LE sheath 617B varies along the spanwise length of the LE sheath 617B.

In some examples, the intentional mistuning feature 605 includes an increased thickness T of the LE sheath 617B of the first intentionally mistuned blade 604B relative to a thickness of the LE sheath 617A of the baseline blade 104A. The mistuning radial index E for the increased thickness T includes a spanwise location of the increased thickness T. The thickness T of the LE sheath 617B of the first intentionally mistuned blade 604B is between four percent to ten percent greater than the thickness of the LE sheath 617A of the baseline blade 104A. The mistuning axial index E is greater than zero percent and less than or equal to one hundred percent, such that the thickness T of the LE sheath 617B is increased greater than zero percent and less than or equal to one hundred percent of the span as compared to the LE sheath 617A. In some examples, the thickness of the LE sheath 617B may be varied along the span of the first intentionally mistuned blade 604B. Varying the thickness T of the LE sheath 617B along the span of the first intentionally mistuned blade 604B provides a more targeted change to the natural frequencies and/or the mode shapes of the first intentionally mistuned blade 604B relative to the baseline natural frequencies and/or the baseline mode shapes of the baseline blades 104A, while minimizing geometric differences of the first intentionally mistuned blade 604B relative to the baseline blades 104A. Thus, such a feature limits the impact on aerodynamic performance of the first intentionally mistuned blades 104B, while also improving durability of the LE 109B to impacts from foreign body damage or domestic body damage.

FIG. 6B shows the larger chord and the greater thickness T of the LE sheath 617B of the first intentionally mistuned blade 604B. For example, the chord of the LE sheath 617B is greater than or equal to five percent and less than or equal to twenty five percent greater than the chord of the LE sheath 617A (shown by dashed lines in FIG. 6B). For example, the mistuning axial index D is greater than or equal to five percent and less than or equal to twenty five percent. Increasing the chord length of the LE sheath 617B and/or increasing the thickness T of the LE sheath 617B relative to the LE sheath 617A provides for an increased flutter margin of the first intentionally mistuned blade 604B relative to the baseline blade 104A.

The mistuning axial index D and the thickness T of the LE sheath 617B can be selected based on improving flutter mitigation, while providing for impact protection and balance of the first intentionally mistuned blade 604B. For example, if the chord of the LE sheath 617B is too small, the LE sheath 617B will not provide adequate protection against impacts. If the chord of the LE sheath 617B is too large, aerodynamic performance of the first intentionally mistuned blade 604B is decreased. Similarly, if the thickness of the LE sheath 617B is too little, the LE sheath 617B will not provide adequate protection against impacts. If the thickness of the LE sheath 617B is too great, aerodynamic performance of the first intentionally mistuned blade 604B is decreased. While the embodiment of FIGS. 6A and 6B show a LE sheath 617B, a sheath may be placed on the TE 111B of the first intentionally mistuned blade 604B in some examples.

Figure 7:
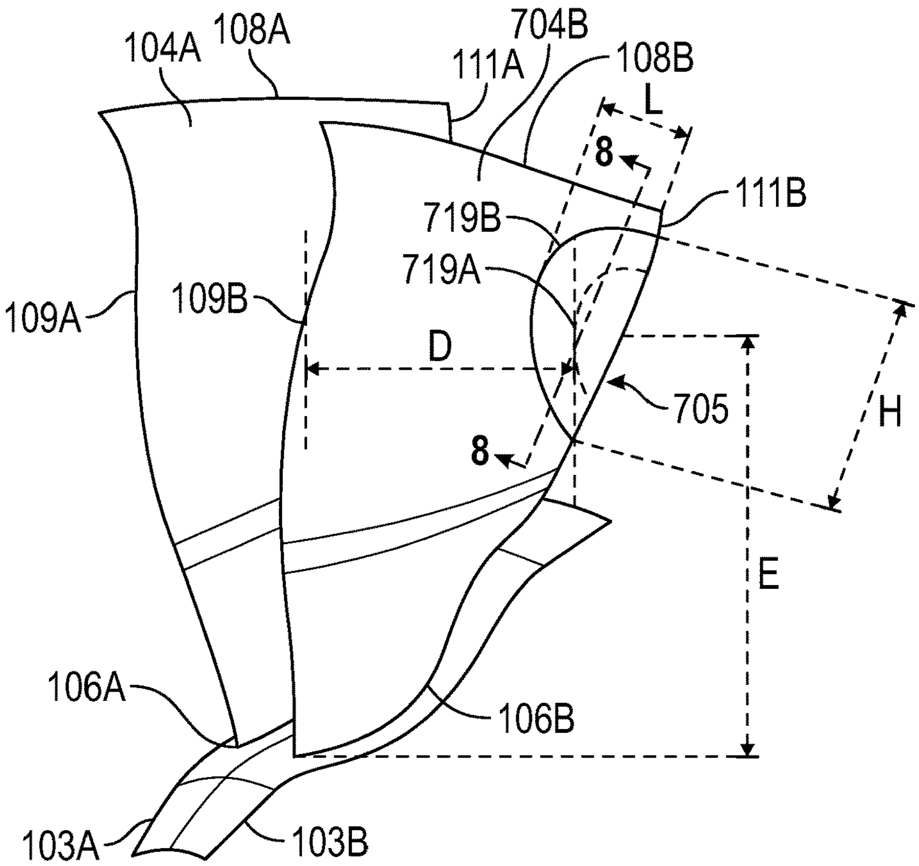
FIG. 7 is a schematic perspective view of a baseline blade and an intentionally mistuned blade, according to another embodiment of the present disclosure.

FIG. 7 is a schematic perspective view of a baseline blade 104A and a first intentionally mistuned blade 704B having an intentional mistuning feature 705. The baseline blade 104A and the first intentionally mistuned blade 704B each includes substantially the same airfoil profile shape. Further, the span and the chord of the first intentionally mistuned blade 704B are substantially the same as the span and the chord of the baseline blade 104A, respectively.

The baseline blade 104A includes an internal cavity 719A (represented by dashed lines on the first intentionally mistuned blade 104B) and the first intentionally mistuned blade 704B includes an internal cavity 719B. In the embodiment of FIG. 7, the intentional mistuning feature 705 includes variation in the spanwise location or chordwise location and/or the radial height or the axial length of the internal cavity 719B compared to the spanwise location or chordwise location and/or the radial height or the axial length of the internal cavity 719A. A center of the internal cavity 719A includes a radial location (e.g., a spanwise location) and an axial location (e.g., a chordwise location) of the baseline blade 104A. A center of the internal cavity 719B includes a radial location (e.g., a spanwise location) and an axial location (e.g., a chordwise location) of the first intentionally mistuned blade 704B.

The mistuning radial index E of the internal cavity 719B includes the radial location (e.g., a spanwise location) of the center of the internal cavity 719B. The mistuning axial index D of the internal cavity 719B includes the axial location (e.g., a chordwise location) of the center of the internal cavity 719B. The mistuning radial index E of the internal cavity 719B is greater than or equal to fifty percent and less than or equal to ninety five percent of the span of the first intentionally mistuned blade 704B. The mistuning axial index D of the internal cavity 719A is greater than or equal to ten percent and less than or equal to ninety percent of the chord of the first intentionally mistuned blade 704B. In this way, the second radial location and the second axial location of the center of the internal cavity 719B are different than the first radial location and the first axial location of the center of the internal cavity 719A. Thus, the mistuning axial index D and the mistuning radial index E of the internal cavity 719B provide for mistuning the natural frequencies of the first intentionally mistuned blade 704B relative to the baseline natural frequencies of the baseline blades 104A. Further, the mistuning axial index D and the mistuning radial index E provide for mistuning mode shapes of the first intentionally mistuned blade 704B relative to the baseline mode shapes of the baseline blades 104A.

In some examples, the size of the internal cavity 719B of the first intentionally mistuned blade 704B is varied as compared to the size of the internal cavity 719A of the baseline blade 104A. For example, a radial height H of the internal cavity 719B is five percent to twenty percent greater than a radial height of the internal cavity 719A. Similarly, an axial length L of the internal cavity 719B is greater than or equal to five percent and less than or equal to ninety percent greater than an axial length L of the internal cavity 719A. Varying the location and/or varying the size of the internal cavity 719B relative to the internal cavity 719A provides for mistuning natural frequencies mistuning and mistuning mode shapes of the first intentionally mistuned blade 704B relative to the baseline natural frequencies and/or the baseline mode shapes of the baseline blades 104A, as detailed above, without sacrificing aerodynamic performance of the first intentionally mistuned blade 704B relative to the aerodynamic performance of the baseline blades 104A.

Figures 8A, 8B, 8C, 8D:
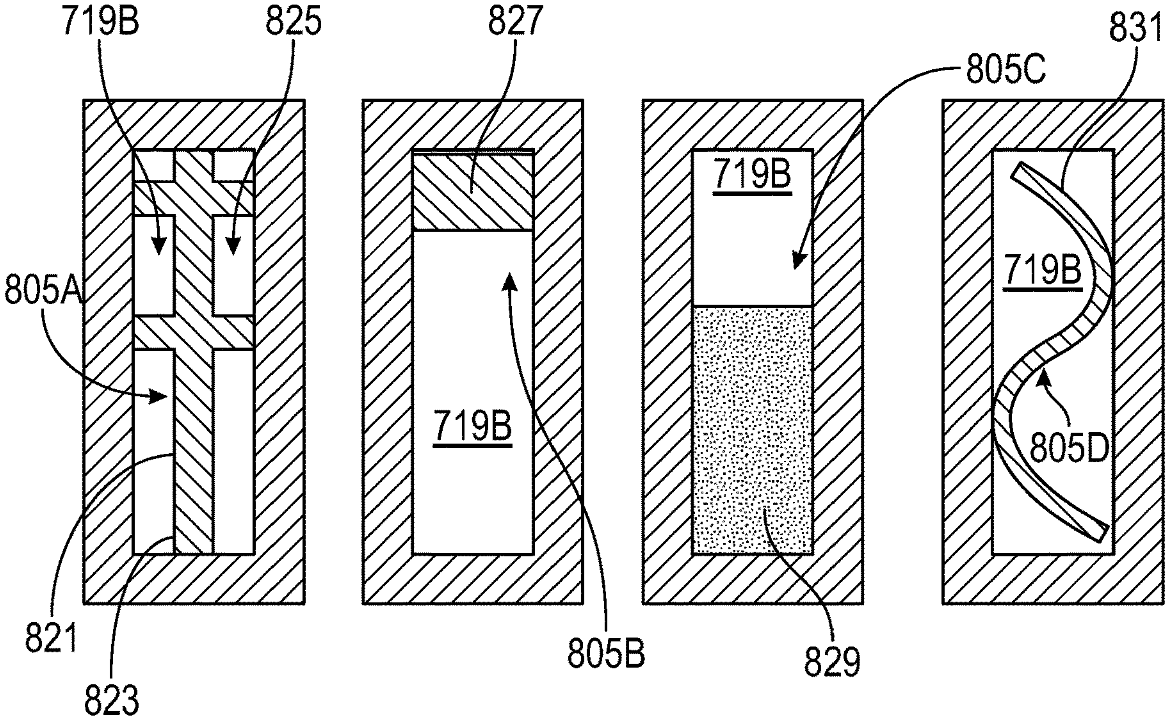
FIG. 8A is a schematic cross-sectional view, taken at detail 8-8 in FIG. 7, of an internal cavity of the intentionally mistuned blade, according to an aspect of the present disclosure.
FIG. 8B is a schematic cross-sectional view of an internal cavity of the intentionally mistuned blade, according to another embodiment of the present disclosure.
FIG. 8C is a schematic cross-sectional view of an internal cavity of the intentionally mistuned blade, according to another embodiment of the present disclosure.
FIG. 8D is a schematic cross-sectional view of an internal cavity of the intentionally mistuned blade, according to another embodiment of the present disclosure.

FIG. 8A is a schematic cross-sectional view, taken at detail 8-8 in FIG. 7, of the internal cavity 719B, according to an aspect of the present disclosure. In the embodiment of FIG. 8A, the internal cavity 719B includes an intentional mistuning feature 805A. The intentional mistuning feature 805A includes an insert disposed within the internal cavity 719B of the first intentionally mistuned blade 704B (FIG. 7). The baseline blade 104A does not include an insert. In some examples, the baseline blade 104A includes an insert that is different than the insert of the first intentionally mistuned blade 704B. In this way, the baseline blade 104A including the insert includes baseline natural frequencies and/or baseline mode shapes and the first intentionally mistuned blade 704B includes natural frequencies and/or mode shapes that are different than the baseline frequencies and/or baseline mode shapes of the baseline blade 104A.

In FIG. 8A, the intentional mistuning feature 805A includes an impact damper 821 disposed within the internal cavity 719B. The impact damper 821 includes a cantilever beam 823 with a hammer section 825. The cantilever beam 823 includes a first end attached to a bottom surface of the internal cavity 719B and includes a free end opposite the first end. The hammer section 825 is disposed at the free end. In this way, the hammer section 825 moves within the internal cavity 719B. As the first intentionally mistuned blade 704B vibrates, the hammer section 825 may impact a surface of the internal cavity 719B. In this way, vibrations of the first intentionally mistuned blade 704B are dampened. The impact damper 821 may be tuned to dampen a particular vibration frequency. The impact damper 821 provides moderate damping, while providing a higher stiffness for structural integrity of the first intentionally mistuned blade 704B relative to the baseline blade 104A and increased flutter margin.

FIG. 8B is another schematic cross-sectional view of the internal cavity 719B, according to another embodiment of the present disclosure. In the embodiment of FIG. 8B, the internal cavity 719B includes an intentional mistuning feature 805B. The intentional mistuning feature 805B includes an insert disposed within the internal cavity 719B of the first intentionally mistuned blade 704B (FIG. 7). In FIG. 8B, the intentional mistuning feature 805B includes a mass 827 disposed within the internal cavity 719B. The mass 827 may include, for example, a metallic weight. The mass 827 may include any material for providing additional weight to the first intentionally mistuned blade 704B relative to the baseline blade 104A. The mass 827 is attached to the surface of the internal cavity 719B such that the mass 827 is not movable within the internal cavity 719B. Thus, the first intentionally mistuned blade 704B includes additional weight relative to the baseline blade 104A. In this way, the mass 827 mistunes natural frequencies and/or mistunes mode shapes of the first intentionally mistuned blade 704B relative to the baseline natural frequencies and/or the baseline mode shapes of the baseline blade 104A.

FIG. 8C is another schematic cross-sectional view of the internal cavity 719B, according to another embodiment of the present disclosure. In the embodiment of FIG. 8C, the internal cavity 719B includes an intentional mistuning feature 805C. The intentional mistuning feature 805C includes an insert disposed within the internal cavity 719B of the first intentionally mistuned blade 704B (FIG. 7). In FIG. 8C, the intentional mistuning feature 805C includes a powder material including a powder material 829 disposed within the internal cavity 719B. The powder material 829 may include, for example, a metallic powder, sand, or any other material. The powder material 829 freely moves within the internal cavity 719B. For example, the powder material 829 may move to another portion or a top portion of the internal cavity 719B when the first intentionally mistuned blade 704B rotates. The powder material 829 provides additional weight to the first intentionally mistuned blade 704B relative to a weight of the baseline blade 104A. In this way, the powder material 829 mistunes natural frequencies and/or mistunes mode shapes of the first intentionally mistuned blade 704B relative to the baseline natural frequencies and/or baseline mode shapes of baseline blade 104A.

FIG. 8D is another schematic cross-sectional view of the internal cavity 719B, according to another embodiment of the present disclosure. In the embodiment of FIG. 8D, the internal cavity 719B includes an intentional mistuning feature 805D. The intentional mistuning feature 805D includes an insert disposed within the internal cavity 719B of the first intentionally mistuned blade 704B (FIG. 7). In FIG. 8D, the intentional mistuning feature 805D includes a friction damper 831. The friction damper 831 includes a biasing member disposed within the internal cavity 719B. As used herein, a "biasing member" includes a resilient, rigid, semi-rigid, flexible, or elastic member, and may be formed of any material, such as, for example, metals, polymers, plastics, elastomers, composite materials, rubber, or the like. In the exemplary embodiment, the friction damper 831 includes a spring. The friction damper 831 is disposed within the internal cavity 719B such that the friction damper 831 contacts an inner surface of the internal cavity 719B. As the first intentionally mistuned blade 704B vibrates, the friction damper 831 may impact a surface of the internal cavity 719B. In this way, vibrations of the first intentionally mistuned blade 704B are dampened. The friction damper 831 may be tuned to dampen a particular vibration frequency. For example, the friction damper 831 may be tuned to provide damping for modes that are susceptible to flutter while not impacting other modes. In this way, the friction damper 831 mistunes natural frequencies and/or mistunes mode shapes of the first intentionally mistuned blade 704B relative to the baseline natural frequencies and/or baseline mode shapes of the baseline blade 104A.

Figure 9:
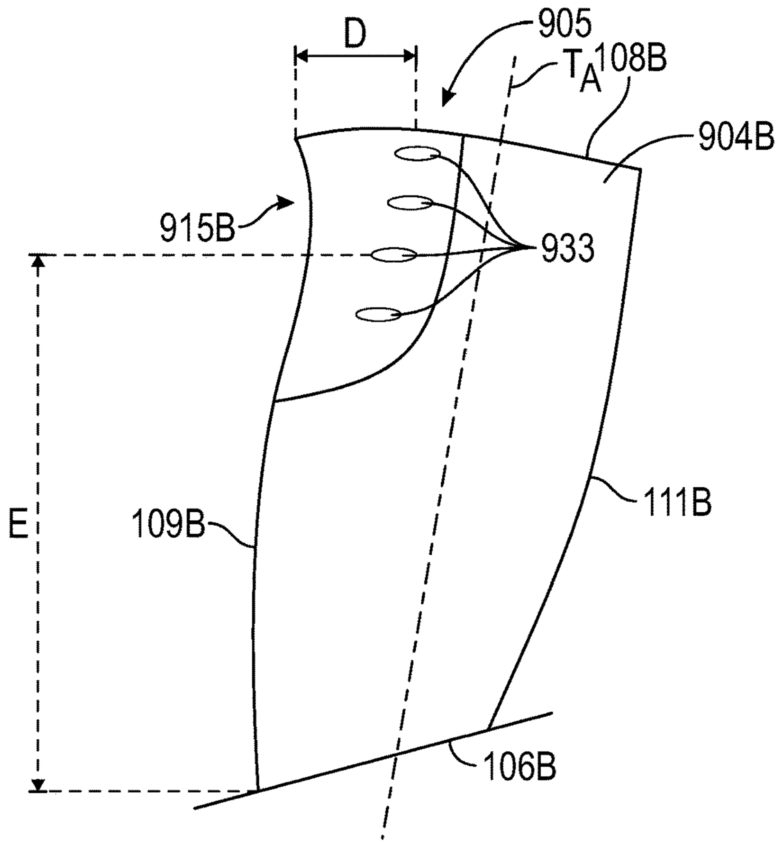
FIG. 9 is a schematic view of an intentionally mistuned blade, according to another embodiment of the present disclosure.

FIG. 9 is a schematic view of a first intentionally mistuned blade 904B having an intentional mistuning feature 905, according to an aspect of the present disclosure. The baseline blade 104A and the first intentionally mistuned blade 904B each includes substantially the same airfoil profile shape. Further, the span and the chord of the first intentionally mistuned blade 904B are substantially the same as the span and the chord of the baseline blade 104A, respectively. As detailed above, shocks may propagate in a tip region of the plurality of blades 104 and may cause flutter due to the added work on the blades 104.

In the embodiment of FIG. 9, the intentional mistuning feature 905 includes one or more shock control bumps 933. The shock control bumps 933 are bumps on the aerodynamic surfaces of the first intentionally mistuned blade 904B to alter the behavior of the shock and to improve aerodynamic performance. The shock control bumps 933 are located on a suction side of the first intentionally mistuned blade 904B. FIG. 9 illustrates four shock control bumps 933 each having a generally elliptical shape. The shock control bumps 933 may include any size, any shape, and any number of shock control bumps 933 and may be spaced from each other at any spacing, as necessary, for altering the behavior of the shock, as detailed further below. In some examples, the shock control bumps 933 include shock control bumps each having the same shape and having the same size. In some examples, the shock control bumps 933 include shock control bumps having different shapes and/or having different sizes. The baseline blade 104A does not include shock control bumps. In some examples, the shock control bumps 933 comprise a different number of shock control bumps and/or are positioned in a different location on the first intentionally mistuned blade 904B relative to a number and/or a location of shock control bumps on the baseline blade 104A.

In the embodiment of FIG. 9, the mistuning axial index D is defined as the axial distance between the LE 109B of the first intentionally mistuned blade 904B to a center of a respective shock control bump 933. The mistuning radial index E is defined as the radial height from the base 106B of the first intentionally mistuned blade 904B to a center of a respective shock control bump 933. Preferably, the shock control bumps 933 are located on the first intentionally mistuned blade 904B to control the shock location closer to the torsional axis TA of the first intentionally mistuned blade 904B relative to a location of the shocks on the baseline blades 104A. For example, a chordwise distance of the shock control bumps 933 is less than ten percent from the torsional axis TA. In this way, any shock (e.g., whether strong or weak) formed at a first intentionally mistuned blade 904B is closer to the torsional axis TA of the first intentionally mistuned blade 904B as compared to the baseline blade 104A. Thus, any shock that forms on the first intentionally mistuned blade 904B does not generate enough work to cause flutter. The torsional axis TA is defined at forty percent to fifty percent of the chord of the first intentionally mistuned blade 904B.

Accordingly, the mistuning axial index D of the shock control bumps 933 is greater than or equal to twenty-five percent and less than or equal to forty percent of the chord of the first intentionally mistuned blade 904B. In other words, the shock control bumps 933 are located at twenty-five percent to forty percent of the chord of the first intentionally mistuned blade 904B. The mistuning radial index E of the shock control bumps 933 is greater than or equal to seventy percent and less than or equal to one hundred percent of the span of the first intentionally mistuned blade 904B. In this way, the shock control bumps 933 are located in a tip region 915B of the first intentionally mistuned blade 904B. Such a range of the mistuning axial index D and of the mistuning radial index E of the shock control bumps 933 controls the location of the shocks on the first intentionally mistuned blade 904B closer to the torsional axis of the first intentionally mistuned blade 904B relative to a location of the shocks on the baseline blade 104A. In this way, the shock control bumps 933 increase the flutter margin on the first intentionally mistuned blade 904B. The shock control bumps 933 also mistune natural frequencies and/or mistune mode shapes of the first intentionally mistuned blade 904B relative to the baseline natural frequencies and/or baseline mode shapes of the baseline blades 104A.

Figure 10A:
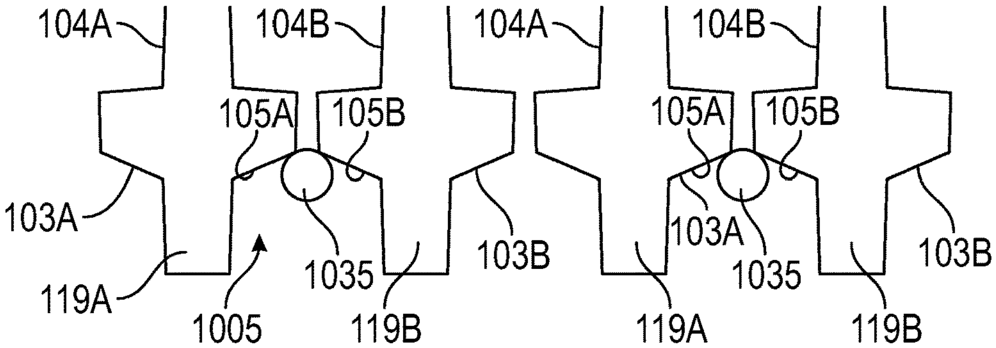
FIG. 10A is a schematic partial front view of an array of baseline blades and intentionally mistuned blades, according to another embodiment of the present disclosure.
Figure 10B:
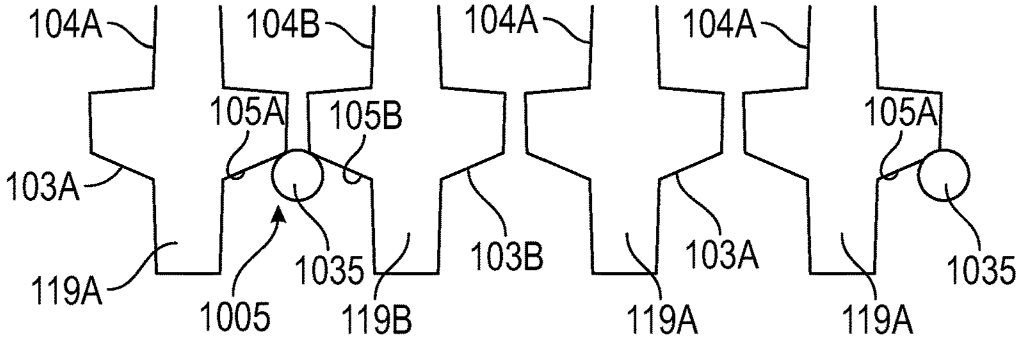
FIG. 10B is a schematic partial front view of an array of baseline blades and intentionally mistuned blades, according to another embodiment of the present disclosure.

FIGS. 10A and 10B are schematic partial front views of an array of baseline blades 104A and first intentionally mistuned blades 104B having an intentional mistuning feature 1005, according to aspects of the present disclosure. As shown in FIGS. 10A and 10B, the baseline blades 104A include a dovetail 119A (shown schematically in FIGS. 10A and 10B) that extends radially inward from the platform 103A. Similarly, the first intentionally mistuned blades 104B include a dovetail 119B (shown schematically in FIGS. 10A and 10B) that extends radially inward from the platform 103B. The dovetail 119A and the dovetail 119B are inserted into corresponding slots in the rotor 102 (FIG. 2) to mount the baseline blades 104A and the first intentionally mistuned blades 104B to the rotor 102, respectively.

The first intentionally mistuned blades 104B include an under-platform damper 1035. In this way, the under-platform dampers 1035 are positioned alternately in a periodic fashion in the circumferential direction, to mistune natural frequencies of the first intentionally mistuned blades 104B relative to baseline natural frequencies of the baseline blades 104A to stabilize flutter of the blades 104. The under-platform dampers 1035 may be hollow or solid. Further, the under-platform dampers 1035 may be made from any material known in the art, such as a metal, a ceramic matrix composite (CMC), an alloy, or the like. The size, the shape, and the material of the under-platform dampers 1035 may be selected to provide a desired natural frequency mistuning of the first intentionally mistuned blades 104B relative to the baseline natural frequencies of the baseline blades 104A. When installed, the under-platform dampers 1035 contact a radially inner surface 105A and a radially inner surface 105B of adjacent platforms 103A, 103B. In this way, the under-platform dampers 1035 are located between the dovetails 119A, 119B and the radially inner surfaces 105A, 105B of the platforms 103A, 103B. In some examples, the size, the shape, and the material of the under-platform dampers 1035 may be varied between various under-platform dampers 1035 to vary natural frequencies of the first intentionally mistuned blades 104B relative to baseline natural frequencies of the baseline blades 104A.

The under-platform dampers 1035 allow for intentionally mistuning without modifying the geometry of the airfoils of the first intentionally mistuned blades 104B. In this way, the airfoils of the plurality of blades 104 may have substantially identical cross-sectional geometry. Thus, the embodiments of FIGS. 10A and 10B provide for damping to mitigate the flutter without reducing aerodynamic efficiency of the first intentionally mistuned blades 104B.

In the embodiment of FIG. 10A, the under-platform dampers 1035 are arranged such that the plurality of blades 104 are arranged in the ABABAB pattern. In the embodiment of FIG. 10B, the under-platform dampers 1035 are arranged such that the plurality of blades 104 are arranged in the AABAAB pattern. In this way, the first intentionally mistuned blades 104B break up the self-excited fluid structure interactions formed by the baseline blades 104A, as detailed above. The under-platform dampers 1035 may be arranged for any airfoil distribution pattern, as detailed above.

Figure 10C:
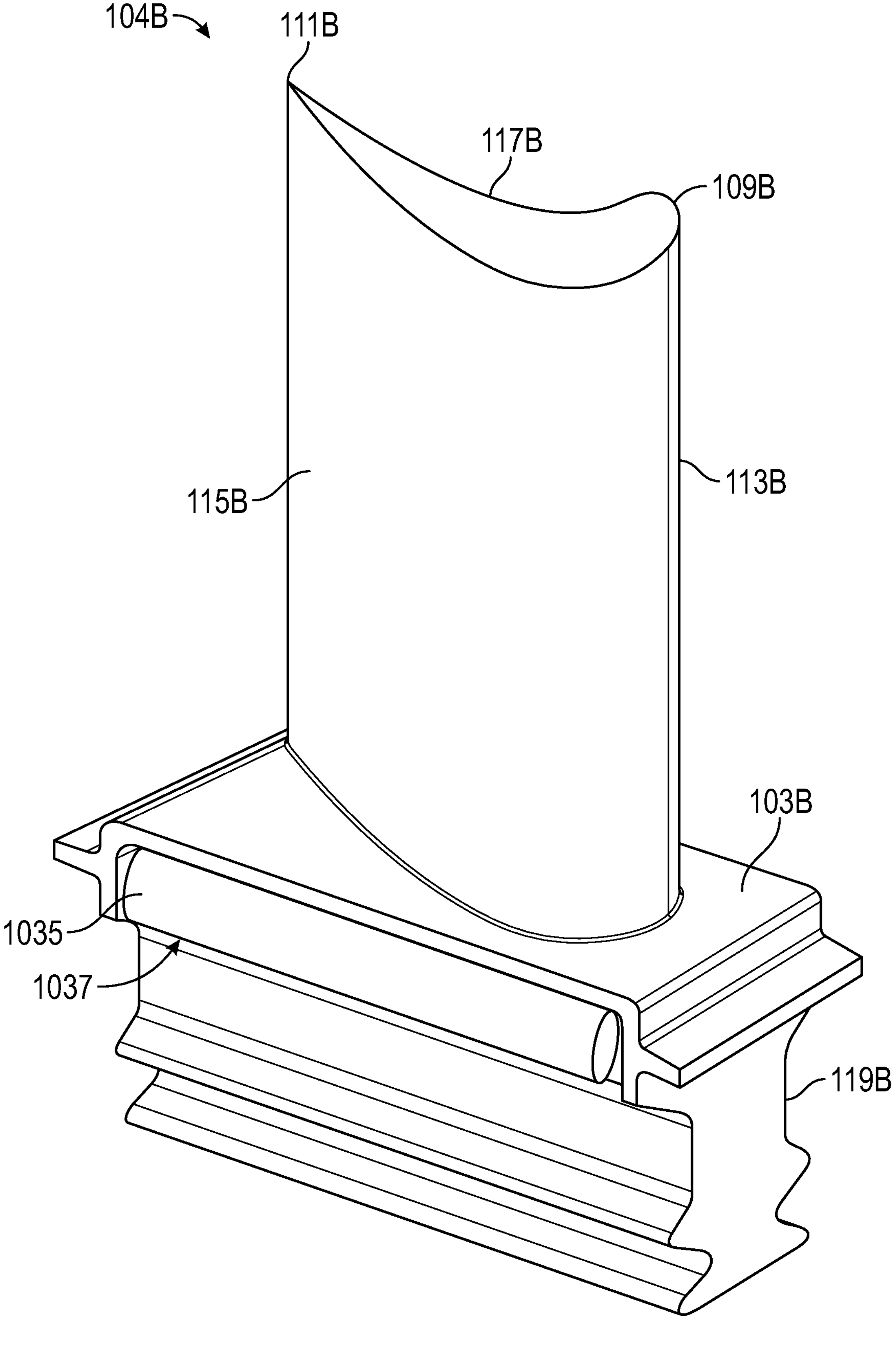
FIG. 10C is a front side view of an intentionally mistuned blade having an under-platform damper, according to an embodiment of the present disclosure.

FIG. 10C is a front side view of a first intentionally mistuned blade 104B having an under-platform damper 1035, according to an aspect of the present disclosure. FIG. 10C shows the first intentionally mistuned blade 104B includes an airfoil 113B having a suction side 115B and a pressure side 117B. The dovetail 119B includes a groove 1037. The under-platform damper 1035 is inserted into the groove 1037. In this way, the under-platform damper 1035 is supported by the groove 1037. The under-platform damper 1035 is inserted into a corresponding groove of the baseline blade 104A such that the under-platform damper 1035 is mounted between the first intentionally mistuned blade 104B and the baseline blade 104A, as detailed above. FIG. 10C shows the under-platform damper 1035 includes a generally cylindrical shape that extends substantially an entire axial length of the groove 1037. The under-platform damper 1035 may include any shape, any size, and any length, as necessary, for mistuning natural frequencies of the first intentionally mistuned blades 104B relative to baseline natural frequencies of the baseline blades 104A.

The under-platform damper 1035 is located on the suction side 115B of the airfoil 113B of the first intentionally mistuned blade 104B. In this way, the under-platform damper 1035 is located on a pressure side of an airfoil of the baseline blade 104A in the patterns in FIGS. 10A and 10B. In some examples, the under-platform dampers 1035 is located on the pressure side 117B of the airfoil 113B of the first intentionally mistuned blade 104B, such that the under-platform damper 1035 is located on the suction side of the airfoil of the baseline blade 104A. Thus, a respective first intentionally mistuned blade 104B includes an under-platform damper 1035 on a first side thereof and does not include an under-platform damper 1035 on a second side that is opposite to the first side of the first intentionally mistuned blade 104B. In this way, baseline blades 104A that are arranged between other baseline blades 104A or that are arranged next to a first intentionally mistuned blade 104B on an opposite circumferential side as the under-platform damper 1035 will not contact an under-platform damper 1035. For example, in the AABAAB pattern of FIG. 10B, the first "A" blade and the third "A" blade do not contact an under-platform damper 1035 when the under-platform dampers 1035 are positioned on the suction side of the "B" blades (e.g., the first "A" blade and the third "A" blade are located circumferentially between the pressure side of a "B" blade and another "A" blade).

Table 2 provides a summary of the mistuning axial index D and the mistuning radial index E associated with each example discussed above.

TABLE 2

| Example | Mistuning Axial Index (D) | Mistuning Radial Index (E) |
|---|---|---|
| Example 1 | 0 to 18% | 85 to 100% |
| Example 2 | 5 to 25% | 0 to 100% |
| Example 3 | 10 to 90% | 50 to 95% |
| Example 4 | 25 to 40% | 70 to 100% |

In Example 1, the intentional mistuning feature is a reduction in the chord length in a tip region of the intentionally mistuned blade compared to the chord length of the baseline blade to control the loading shock and to reduce the destabilizing aerodynamic work on the intentionally mistuned blade. In Example 2, the intentional mistuning feature is varying a chord length and a thickness of a sheath (e.g., a LE sheath) of the intentionally mistuned blades as compared to the chord length and the thickness of a sheath of the baseline blades. In Example 3, the intentional mistuning feature is varying a size and/or a shape of an internal cavity of the intentionally mistuned blades compared to an internal cavity of the baseline blades to vary the blade mass distribution. In Example 4, the intentional mistuning feature is one or more shock control bumps on the intentionally mistuned blades to control the loading shock location to increase the flutter margin of the intentionally mistuned blades. As discussed above, the embodiments disclosed herein may include any range of the mistuning axial index D and the mistuning radial index E.

In some embodiments, the intentional mistuning feature is a mass in the internal cavity of the intentionally mistuned blades. In some embodiments, the intentional mistuning feature is a metallic powder in the internal cavity of the intentionally mistuned blades. In some embodiments, the intentional mistuning feature is an internally tuned impact damper in the internal cavity of the intentionally mistuned blades. In some embodiments, the intentional mistuning feature is a friction damper in the internal cavity of the intentionally mistuned blades. In some embodiments, the intentional mistuning feature is an under-platform damper for the intentionally mistuned blades.

The intentional mistuning feature may include any of the embodiments described herein, or combinations thereof, to achieve an improved balance of aerodynamic performance, natural frequency mistuning, and/or mode shape mistuning of the intentionally mistuned blades relative the aerodynamic performance, natural frequencies, and/or mode shapes of the baseline blades to mitigate flutter, as discussed above.

Further aspects are provided by the subject matter of the following clauses:

A rotor blade system including a rotor and a plurality of blades. The plurality of blades are coupled to the rotor. The plurality of blades are arranged in an airfoil distribution pattern. The airfoil distribution pattern includes one or more baseline blades and one or more intentionally mistuned blades that include an intentional mistuning feature. The intentional mistuning feature is selected from the group that consists of: a reduced chord length in a tip region of the one or more intentionally mistuned blades relative to a chord length of the one or more baseline blades, a varied spanwise location or chordwise location and/or a varied radial height or axial length of an internal cavity of the one or more intentionally mistuned blades relative to a spanwise location or chordwise location and/or a radial height or axial length of an internal cavity of the one or more baseline blades, a mass in the internal cavity of the one or more intentionally mistuned blades, a powder material in the internal cavity of the one or more intentionally mistuned blades, a tuned impact damper in the internal cavity of the one or more intentionally mistuned blades, a friction damper in the internal cavity of the one or more intentionally mistuned blades, a varied chord length and/or a varied thickness of a sheath of the one or more intentionally mistuned blades relative to a chord length and/or a thickness of a sheath of the one or more baseline blades, one or more shock control bumps on the one or more intentionally mistuned blades, an under-platform damper positioned under a platform of the one or more intentionally mistuned blades, or combinations thereof.

The rotor blade system of the preceding clause, the one or more baseline blades do not include an intentional mistuning feature.

The rotor blade system of any preceding clause, the airfoil distribution pattern being selected from the group consisting of: AB, AAB, AAAB, ABC, or a combination thereof. A is a baseline blade. B is a first intentionally mistuned blade with a first intentional mistuning feature. C is a second intentionally mistuned blade with a second intentional mistuning feature different than the first intentional mistuning feature.

The rotor blade system of any preceding clause, the intentional mistuning feature including a mistuning radial index greater than zero percent and less than or equal to one hundred percent and a mistuning axial index greater than zero percent and less than or equal to ninety percent The rotor blade system of any preceding clause, the mistuning radial index being one hundred percent.

The rotor blade system of any preceding clause, the mistuning radial index being greater than or equal to eighty-five percent and less than or equal to one hundred percent.

The rotor blade system of any preceding clause, the mistuning radial index being greater than or equal to seventy percent and less than or equal to one hundred percent.

The rotor blade system of any preceding clause, the mistuning radial index being greater than or equal to fifty percent and less than or equal to ninety-five percent.

The rotor blade system of any preceding clause, the mistuning axial index being greater than or equal to ten percent and less than or equal to ninety percent.

The rotor blade system of any preceding clause, the mistuning axial index being greater than zero percent and less than or equal eighteen percent.

The rotor blade system of any preceding clause, the mistuning axial index being greater than or equal to five percent and less than or equal to twenty-five percent.

The rotor blade system of any preceding clause, the mistuning axial index being greater than or equal to twenty-five percent and less than or equal to forty percent.

The rotor blade system of any preceding clause, the mistuning axial index varying as a function of the mistuning radial index.

The rotor blade system of any preceding clause, the sheath of the one or more intentionally mistuned blades extending substantially an entire spanwise length of the one or more intentionally mistuned blades.

The rotor blade system of any preceding clause, the chord length of the sheath of the one or more intentionally mistuned blades varying along a span of the one or more intentionally mistuned blades.

The rotor blade system of any preceding clause, the thickness of the sheath of the one or more intentionally mistuned blades varying along a span of the one or more intentionally mistuned blades.

The rotor blade system of any preceding clause, the sheath being made of metal.

The rotor blade system of any preceding clause, the tuned impact damper including a hammer section that impacts an interior surface of the internal cavity of the one or more intentionally mistuned blades.

The rotor blade system of any preceding clause, the friction damper including a biasing member that impacts an interior surface of the internal cavity of the one or more intentionally mistuned blades.

The rotor blade system of any preceding clause, the powder material including a metal powder or sand.

The rotor blade system of any preceding clause, a chordwise distance of the one or more shock control bumps being less than ten percent from a torsional axis of the one or more intentionally mistuned blades.

The rotor blade system of any preceding clause, the one or more intentionally mistuned blades including an under-platform damper on a first side of a respective intentionally mistuned blade and not including an under-platform damper on a second side that is opposite to the first side of the respective intentionally mistuned blade.

A turbine engine including a fan section, a compressor section, and a turbine section. At least one of the fan section, the compressor section, and the turbine section includes a rotor blade system. The rotor blade system includes a rotor and a plurality of blades. The plurality of blades are coupled to the rotor and the plurality of blades are arranged in an airfoil distribution pattern. The airfoil distribution pattern includes one or more baseline blades and one or more intentionally mistuned blades. The one or more intentionally mistuned blades includes an intentional mistuning feature. The intentional mistuning feature is selected from the group that consists of: a reduced chord length in a tip region of the one or more intentionally mistuned blades relative to a chord length of the one or more baseline blades, a varied spanwise location or chordwise location and/or a varied radial height or axial length of an internal cavity of the one or more intentionally mistuned blades relative to a spanwise location or chordwise location and/or a radial height or axial length of an internal cavity of the one or more baseline blades, a mass in the internal cavity of the one or more intentionally mistuned blades, a powder material in the internal cavity of the one or more intentionally mistuned blades, a tuned impact damper in the internal cavity of the one or more intentionally mistuned blades, a friction damper in the internal cavity of the one or more intentionally mistuned blades, a varied chord length and/or a varied thickness of a sheath of the one or more intentionally mistuned blades relative to a chord length and/or a thickness of a sheath of the one or more baseline blades, one or more shock control bumps on the one or more intentionally mistuned blades, an under-platform damper positioned under a platform of the one or more intentionally mistuned blades, or combinations thereof.

The turbine engine of any preceding clause, the one or more baseline blades do not include an intentional mistuning feature.

The turbine engine of any preceding clause, the airfoil distribution pattern being selected from the group. The group consists of, AB, AAB, AAAB, ABC, or a combination thereof. A is a baseline blade. B is a first intentionally mistuned blade with a first intentional mistuning feature. C is a second intentionally mistuned blade with a second intentional mistuning feature different than the first intentional mistuning feature.

The turbine engine of any preceding clause, the intentional mistuning feature including a mistuning radial index greater than zero percent and less than or equal to one hundred percent and a mistuning axial index greater than zero percent and less than or equal ninety percent.

The turbine engine of any preceding clause, the mistuning axial index varying as a function of the mistuning radial index.

The turbine engine of any preceding clause, the mistuning radial index being one hundred percent.

The turbine engine of any preceding clause, the mistuning radial index being greater than or equal to seventy percent and less than or equal to one hundred percent.

The turbine engine of any preceding clause, the mistuning radial index being greater than or equal to seventy percent and less than or equal to one hundred percent.

The turbine engine of any preceding clause, the mistuning axial index being greater than or equal to ten percent and less than or equal to ninety percent.

The turbine engine of any preceding clause, the mistuning radial index being greater than or equal to eighty-five percent and less than or equal to one hundred percent.

The turbine engine of any preceding clause, the mistuning axial index being greater than zero percent and less than or equal to eighteen percent.

The turbine engine of any preceding clause, the mistuning axial index being greater than or equal to five percent and less than or equal to twenty-five percent.

The turbine engine of any preceding clause, the mistuning axial index being greater than or equal to twenty-five percent and less than or equal to forty percent.

The turbine engine of any preceding clause, the sheath of the one or more intentionally mistuned blades extending substantially an entire spanwise length of the one or more intentionally mistuned blades.

The turbine engine of any preceding clause, the chord length of the sheath of the one or more intentionally mistuned blades varying along a span of the one or more intentionally mistuned blades.

The turbine engine of any preceding clause, the thickness of the sheath of the one or more intentionally mistuned blades varying along a span of the one or more intentionally mistuned blades.

The turbine engine of any preceding clause, the sheath being made of metal.

The turbine engine of any preceding clause, the tuned impact damper including a hammer section that impacts an interior surface of the internal cavity of the one or more intentionally mistuned blades.

The turbine engine of any preceding clause, the friction damper including a biasing member that impacts an interior surface of the internal cavity of the one or more intentionally mistuned blades.

The turbine engine of any preceding clause, the powder material including a metal powder or sand.

The turbine engine of any preceding clause, a chordwise distance of the one or more shock control bumps being less than ten percent from a torsional axis of the one or more intentionally mistuned blades.

The turbine engine of any preceding clause, the one or more intentionally mistuned blades including an under-platform damper on a first side of a respective intentionally mistuned blade and not including an under-platform damper on a second side that is opposite to the first side of the respective intentionally mistuned blade.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A rotor blade system comprising:

a rotor; and a plurality of blades coupled to the rotor, the plurality of blades arranged in an airfoil distribution pattern, the airfoil distribution pattern comprising one or more baseline blades including a first sheath having a first chord length and a first thickness and one or more intentionally mistuned blades including a second sheath having a second chord length and a second thickness, the one or more intentionally mistuned blades including an intentional mistuning feature that includes at least one of a varied second chord length of the second sheath relative to the first chord length of the first sheath or a varied second thickness of the second sheath relative to the first thickness of the first sheath.

2. The rotor blade system of claim 1, wherein the one or more baseline blades include at least one of a baseline shape, a baseline size, or baseline features, and the intentional mistuning feature is different than the at least one of the baseline shape, the baseline size, or the baseline features of the one or more baseline blades.

3. The rotor blade system of claim 1, wherein the airfoil distribution pattern is selected from the group consisting of: AB, AAB, AAAB, ABC, or a combination thereof, wherein A is a baseline blade, B is a first intentionally mistuned blade with a first intentional mistuning feature, and C is a second intentionally mistuned blade with a second intentional mistuning feature different than the first intentional mistuning feature.

4. The rotor blade system of claim 1, wherein the intentional mistuning feature includes a mistuning radial index that is greater than zero percent and less than or equal to one hundred percent and a mistuning axial index that is greater than zero percent and less than or equal to ninety percent.

5. The rotor blade system of claim 4, wherein the mistuning radial index is one hundred percent.

6. The rotor blade system of claim 4, wherein the mistuning radial index is greater than or equal to eighty-five percent and less than or equal to one hundred percent.

7. The rotor blade system of claim 4, wherein the mistuning radial index is greater than or equal to seventy percent and less than or equal to one hundred percent.

8. The rotor blade system of claim 4, wherein the mistuning radial index is greater than or equal to fifty percent and less than or equal to ninety-five percent.

9. The rotor blade system of claim 4, wherein the mistuning axial index is greater than or equal to ten percent and less than or equal to ninety percent.

10. The rotor blade system of claim 4, wherein the mistuning axial index is greater than zero percent and less than or equal to eighteen percent.

11. The rotor blade system of claim 4, wherein the mistuning axial index is greater than or equal to five percent and less than or equal to twenty-five percent.

12. The rotor blade system of claim 4, wherein the mistuning axial index is greater than or equal to twenty-five percent and less than or equal to forty percent.

13. The rotor blade system of claim 4, wherein the mistuning axial index varies as a function of the mistuning radial index.

14. The rotor blade system of claim 1, wherein the one or more intentionally mistuned blades include one or more first intentionally mistuned blades having a first intentional mistuning feature and one or more second intentionally mistuned blades having a second intentional mistuned feature, the second intentional mistuned feature being different than the first intentional mistuning feature.

15. The rotor blade system of claim 1, wherein the intentional mistuning feature is a first intentional mistuning feature and the one or more intentionally mistuned blades include a second intentional mistuning feature that is selected from the group consisting of:

a reduced chord length from a trailing edge in a tip region of the one or more intentionally mistuned blades relative to a chord length of the one or more baseline blades, at least one of a varied spanwise location of an internal cavity of the one or more intentionally mistuned blades relative to a spanwise location of an internal cavity of the one or more baseline blades, a varied chordwise location of the internal cavity of the one or more intentionally mistuned blades relative to a chordwise location of the internal cavity of the one or more baseline blades, a varied radial height of the internal cavity of the one or more intentionally mistuned blades relative to a radial height of the internal cavity of the one or more baseline blades, or a varied axial length of the internal cavity of the one or more intentionally mistuned blades relative to an axial length of the internal cavity of the one or more baseline blades, a mass in the internal cavity of the one or more intentionally mistuned blades, a powder material in the internal cavity of the one or more intentionally mistuned blades, a tuned impact damper in the internal cavity of the one or more intentionally mistuned blades, a friction damper in the internal cavity of the one or more intentionally mistuned blades, one or more shock control bumps on the one or more intentionally mistuned blades, an under-platform damper positioned under a platform of the one or more intentionally mistuned blades, or combinations thereof.

16. The rotor blade system of claim 1, wherein the second chord length of the second sheath varies along a spanwise length of the second sheath.

17. The rotor blade system of claim 1, wherein the varied second thickness of the second sheath relative to the first thickness of the first sheath of the one or more baseline blades includes the second thickness of the second sheath being four percent to ten percent greater than the first thickness of the first sheath.

18. The rotor blade system of claim 1, wherein the varied second thickness of the second sheath includes the second thickness of the second sheath being varied along a spanwise length of the second sheath.

19. A turbine engine comprising:

a fan section;

a compressor section; and a turbine section, wherein at least one of the fan section, the compressor section, and the turbine section includes a rotor blade system comprising:

a rotor; and a plurality of blades coupled to the rotor, the plurality of blades arranged in an airfoil distribution pattern, the airfoil distribution pattern comprising one or more baseline blades including a first sheath having a first chord length and a first thickness and one or more intentionally mistuned blades including a second sheath having a second chord length and a second thickness, the one or more intentionally mistuned blades including an intentional mistuning feature that includes at least one of a varied second chord length of the second sheath relative to the first chord length of the first sheath or a varied second thickness of the second sheath relative to the first thickness of the first sheath.

20. The turbine engine of claim 19, wherein the intentional mistuning feature is a first intentional mistuning feature and the one or more intentionally mistuned blades include a second intentional mistuning feature that is selected from the group consisting of:

a reduced chord length from a trailing edge in a tip region of the one or more intentionally mistuned blades relative to a chord length of the one or more baseline blades, at least one of a varied spanwise location of an internal cavity of the one or more intentionally mistuned blades relative to a spanwise location of an internal cavity of the one or more baseline blades, a varied chordwise location of the internal cavity of the one or more intentionally mistuned blades relative to a chordwise location of the internal cavity of the one or more baseline blades, a varied radial height of the internal cavity of the one or more intentionally mistuned blades relative to a radial height of the internal cavity of the one or more baseline blades, or a varied axial length of the internal cavity of the one or more intentionally mistuned blades relative to an axial length of the internal cavity of the one or more baseline blades, a mass in the internal cavity of the one or more intentionally mistuned blades, a powder material in the internal cavity of the one or more intentionally mistuned blades, a tuned impact damper in the internal cavity of the one or more intentionally mistuned blades, a friction damper in the internal cavity of the one or more intentionally mistuned blades, one or more shock control bumps on the one or more intentionally mistuned blades, an under-platform damper positioned under a platform of the one or more intentionally mistuned blades, or combinations thereof.

* * * * *